US011004118B1

(12) United States Patent
Chitilian et al.

(10) Patent No.: US 11,004,118 B1
(45) Date of Patent: May 11, 2021

(54) IDENTIFYING CREATIVE OFFERS WITHIN ONLINE CONTENT

(71) Applicant: Google LLC, Mountain View, CA (US)

(72) Inventors: Varouj Chitilian, Hillsborough, CA (US); Amar Anil Chokhawala, Saratoga, CA (US); Girish Deodhar, Cupertino, CA (US); Derek Coatney, San Francisco, CA (US); Wei Wu, Mountain View, CA (US); Tarun Kumar Jain, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 994 days.

(21) Appl. No.: 13/841,510

(22) Filed: Mar. 15, 2013

(51) Int. Cl.
  *G06Q 30/02* (2012.01)
(52) U.S. Cl.
  CPC .............................. *G06Q 30/0277* (2013.01)
(58) Field of Classification Search
  None
  See application file for complete search history.

(56) References Cited

U.S. PATENT DOCUMENTS

| 6,332,127 B1 | 12/2001 | Bandera et al. |
| 2005/0038893 A1 | 2/2005 | Graham |
| 2005/0096975 A1 | 5/2005 | Moshe |
| 2007/0208706 A1 | 9/2007 | Madhavan et al. |
| 2010/0106598 A1 | 4/2010 | Grimes |
| 2012/0010989 A1* | 1/2012 | Ramer ............... G06Q 30/0247 705/14.46 |
| 2012/0066062 A1 | 3/2012 | Yoder et al. |
| 2012/0166433 A1* | 6/2012 | Tseng ................. G06Q 30/0224 707/728 |
| 2012/0239488 A1 | 9/2012 | Zimmerman et al. |

* cited by examiner

*Primary Examiner* — Gautam Ubale
*Assistant Examiner* — Michael J Cross
(74) *Attorney, Agent, or Firm* — Foley & Lardner LLP

(57) ABSTRACT

A computer-implemented method for enhancing an offer included within an online advertisement is implemented by a computing device. The computing device is coupled to a memory device. The method includes storing, within the memory device, a plurality of online advertisements. At least some of the plurality of online advertisements include offers. The method also includes identifying a candidate offer included within an online candidate advertisement from the plurality of online advertisements stored within the memory device, validating the candidate offer including determining that a web site associated with the online candidate advertisement includes data matching the candidate offer, and enhancing the display information associated with the validated candidate offer prior to providing the online candidate advertisement associated with the validated candidate offer.

19 Claims, 7 Drawing Sheets

IDENTIFYING CREATIVE OFFERS WITHIN ONLINE CONTENT

BACKGROUND

This description relates to identifying offers included within certain online content, validating the presence of the offers within the online content, and enhancing display information associated with the online content prior to providing online content to a user.

Online content may contain a variety of information. Some information included within online content may be graphical or textual. The information included in online content may contain references, in some form, to an offer that may be of interest to a viewer of the online content. Examples of such offers may include, without limitation, discounts on merchandise or services, notice of limited availability of merchandise or services, and availability of customized merchandise or services. Some viewers of such online content may have a particular interest in viewing and/or purchasing the offerings suggested or mentioned in the online content. Some viewers may accordingly have a preference to view online content with such offerings.

However, at least some online content contains a broad range of unstructured information and it may therefore be difficult to accurately identify online content that contain offers. It may also be difficult to distinguish online content that is merely promoting merchandise and services generally from other online content with specific offers related to merchandise and services. It may also be difficult to verify that certain online content suggests or claims an offer is actually connected to a real offer on the website of the retailer or merchant responsible for creating the online content.

BRIEF DESCRIPTION OF EXAMPLE EMBODIMENTS

In one aspect, a computer-implemented method for enhancing an offer included within an online advertisement is provided. The method is implemented by a computing device. The computing device is coupled to a memory device. The method includes storing, within the memory device, a plurality of online advertisements. At least some of the plurality of online advertisements includes offers. The method also includes identifying, using the computing device, a candidate offer included within an online candidate advertisement from the plurality of online advertisements stored within the memory device. The method further includes validating the candidate offer including determining that a web site associated with the online candidate advertisement includes data matching the candidate offer. The method additionally includes enhancing display information associated with the validated candidate offer prior to providing the online candidate advertisement associated with the validated candidate offer.

In another aspect, a computing device for enhancing an offer included within an online advertisement is provided. The computing device includes a memory device for storing data. The computing device also includes a processor in communication with the memory device. The processor is programmed to store, within the memory device, a plurality of online advertisements, at least some of the plurality of online advertisements including offers. The processor is also programmed to identify a candidate offer included within an online candidate advertisement from the plurality of online advertisements stored within the memory device. The processor is further programmed to validate the candidate offer including determining that a web site associated with the online candidate advertisement includes data matching the candidate offer. The processor is additionally programmed to enhance display information associated with the validated candidate offer prior to providing the online candidate advertisement associated with the validated candidate offer.

In another aspect, a computer-readable storage device having processor-executable instructions embodied thereon, for enhancing an offer included within an online advertisement is provided. The computing device includes at least one processor and a memory device coupled to the processor. When executed by the computing device, the processor-executable instructions cause the computing device to store, within the memory device, a plurality of online advertisements, at least some of the plurality of online advertisements including offers. The processor-executable instructions also cause the computing device to identify a candidate offer included within an online candidate advertisement from the plurality of online advertisements stored within the memory device. The processor-executable instructions further cause the computing device to validate the candidate offer including determining that a web site associated with the online candidate advertisement includes data matching the candidate offer. The processor-executable instructions additionally cause the computing device to enhance display information associated with the validated candidate offer prior to providing the online candidate advertisement associated with the validated candidate offer.

In another aspect, a system for enhancing an offer included within an online advertisement is provided. The system includes means for storing a plurality of online advertisements. At least some of the plurality of online advertisements includes offers. The system also includes means for identifying a candidate offer included within an online candidate advertisement from the plurality of online advertisements. The system further includes means for validating the candidate offer including determining that a web site associated with the online candidate advertisement includes data matching the candidate offer. The system additionally includes means for enhancing display information associated with the validated candidate offer prior to providing the online candidate advertisement associated with the validated candidate offer.

In another aspect, the system described above is provided, wherein the system further includes means for using at least one language processing method to identify candidate offers included within the plurality of online advertisements wherein the at least one language processing method includes at least one of a natural language processing method and a method of applying regular expression patterns.

In another aspect, the system described above is provided, wherein the system further includes means for using at least one language processing method to ignore candidate offers included within the plurality of online advertisements wherein the at least one language processing method includes at least one of a natural language processing method and a method of applying regular expression patterns.

In another aspect, the system described above is provided, wherein the means for enhancing display information further includes means for at least one of adding additional text to the display information, adding additional graphics to the display information, and adding additional user-interface features to the display information.

In another aspect, the system described above is provided, wherein the system further includes means for serving the enhanced display information with extended advertisement information wherein the extended advertisement information includes information associated with an advertiser, the advertiser being associated with the enhanced display information.

In another aspect, the system described above is provided, wherein the means for validating the candidate offer further includes means for using an automated method to identify the presence of matching language in the candidate offer and the website associated with the online candidate advertisement.

In another aspect, the system described above is provided, wherein the system further includes means for removing the enhancement of the display information prior to providing the online advertisement based upon at least one of a fixed schedule, a configurable schedule, and a schedule that varies based upon advertising types.

In another aspect, the system described above is provided, wherein the system further includes means for using a large dataset programming model to identify candidate offers.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, this is for convenience only. Any feature of any drawing may be referenced and/or claimed in combination with any feature of any other drawing.

DETAILED DESCRIPTION

The following detailed description of implementations refers to the accompanying drawings. The same reference numbers in different drawings may identify the same or similar elements. Also, the following detailed description does not limit the claims.

This subject matter described herein relates generally to enhancing an offer included within online content such as an online advertisement, which is then served to a potential consumer ("user"). Specifically, the methods and systems described herein enable the identification, validation, and enhancement of offers within an online advertisement presented to a user viewing the online content on a computing device. That is, methods and systems herein facilitate storing online advertisements, identifying candidate offers included within online candidate advertisements from the online advertisements, validating the candidate offer, and enhancing the display information associated with the validated candidate offer prior to providing the online candidate advertisement to a user.

As used herein, an element or step recited in the singular and proceeded with the word "a" or "an" should be understood as not excluding plural elements or steps, unless such exclusion is explicitly recited. Furthermore, references to "one embodiment" of the subject matter disclosed herein are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: (a) storing, within a memory device, a plurality of online advertisements; (b) identifying, using the computing device, a candidate offer included within an online candidate advertisement from the plurality of online advertisements; (c) validating the candidate offer including determining that a web site associated with the online candidate advertisement includes data matching the candidate offer; and (d) enhancing display information associated with the validated candidate offer prior to providing the online candidate advertisement associated with the validated candidate offer.

Figure 1:
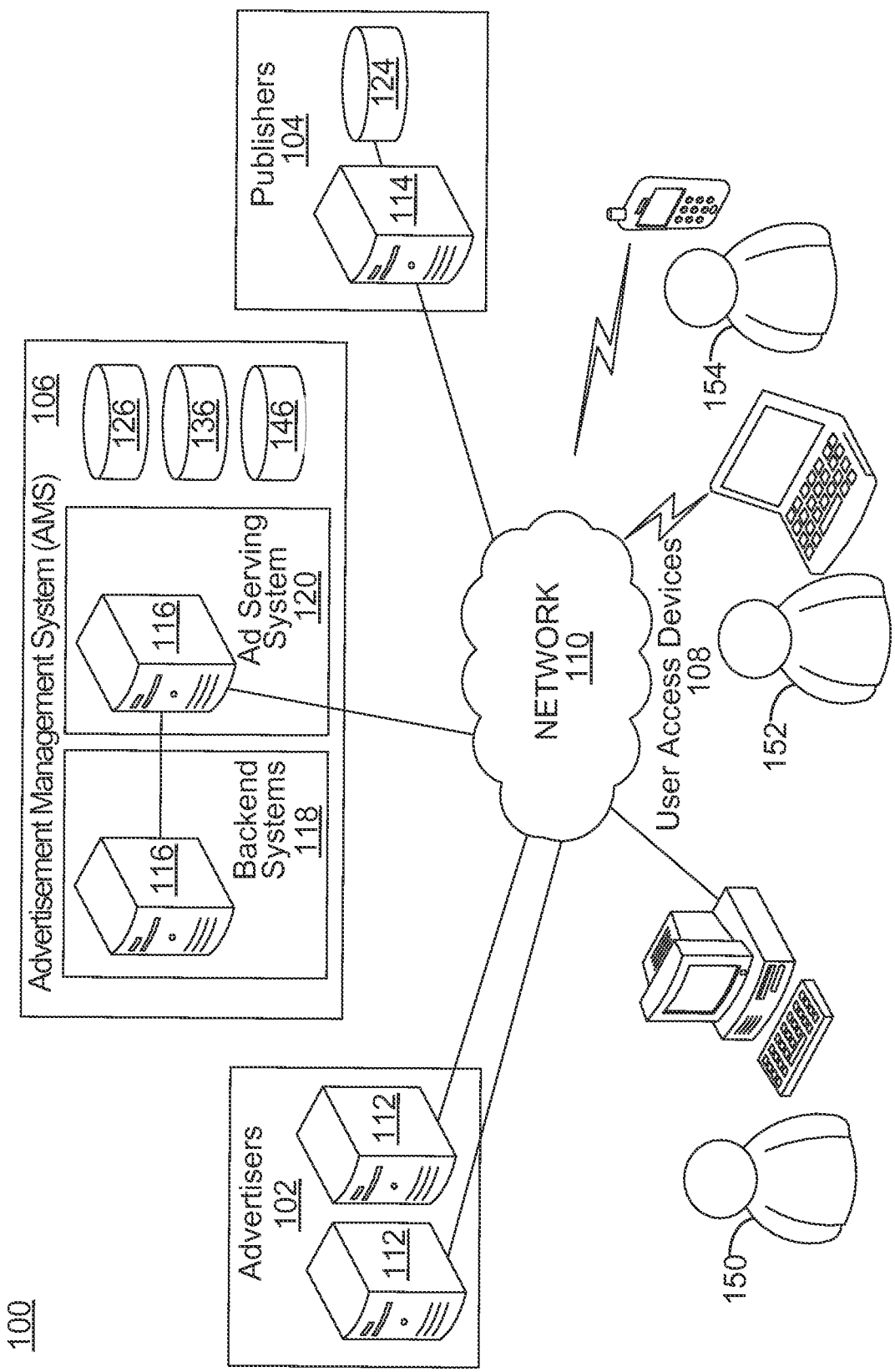
FIG. 1 is a diagram depicting an example advertising environment.

FIG. 1 is a diagram depicting an example advertising environment 100. With reference to FIG. 1, example advertising environment 100 may include one or more advertisers 102, one or more publishers 104, an advertisement management system (AMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as an advertisement distribution network. While reference is made to distributing advertisements, the environment 100 can be suitable for distributing other forms of content including other forms of sponsored content.

The advertisers 102 may include any entities that are associated with advertisements ("ads"). An advertisement or an "ad" refers to any form of communication in which one or more products, services, ideas, messages, people, organizations or other items are identified and promoted (or otherwise communicated). Ads are not limited to commercial promotions or other communications. An ad may be a public service announcement or any other type of notice, such as a public notice published in printed or electronic press or a broadcast. An ad may be referred to as sponsored content.

Ads may be communicated via various mediums and in various forms. In some examples, ads may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads could also be communicated through RSS (Really Simple Syndication) feeds, radio channels, television channels, print media, and other media.

The term "ad" can refer to both a single "creative" and an "ad group." A creative refers to any entity that represents one ad impression. An ad impression refers to any form of presentation of an ad such that it is viewable/receivable by a user. In some examples, an ad impression may occur when an ad is displayed on a display device of a user access device. An ad group refers, for example, to an entity that represents a group of creatives that share a common characteristic, such as having the same ad selection and recommendation criteria. Ad groups can be used to create an ad campaign.

The advertisers 102 may provide (or be otherwise associated with) products and/or services related to ads. The advertisers 102 may include or be associated with, for example, retailers, wholesalers, warehouses, manufacturers, distributors, health care providers, educational establishments, financial establishments, technology providers, energy providers, utility providers, or any other product or service providers or distributors.

The advertisers 102 may directly or indirectly generate, maintain, and/or track ads, which may be related to products or services offered by or otherwise associated with the advertisers. The advertisers 102 may include or maintain one or more data processing systems 112, such as servers or embedded systems, coupled to the network 110. The advertisers 102 may include or maintain one or more processes that run on one or more data processing systems.

The publishers 104 may include any entities that generate, maintain, provide, present and/or otherwise process content in the environment 100. "Publishers," in particular, include authors of content, wherein authors may be individual persons, or, in the case of works made for hire, the proprietor (s) who hired the individual(s) responsible for creating the online content. The term "content" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed publications, or any other form of information that may be presented to a user using a computing device such as one of user access devices 108.

In some implementations, the publishers 104 may include content providers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other content providers. One or more of the publishers 104 may represent a content network that is associated with the AMS 106.

The publishers 104 may receive requests from the user access devices 108 (or other elements in the environment 100) and provide or present content to the requesting devices. The publishers may provide or present content via various mediums and in various forms, including web based and non-web based mediums and forms. The publishers 104 may generate and/or maintain such content and/or retrieve the content from other network resources.

In addition to content, the publishers 104 may be configured to integrate or combine retrieved content with additional sets of content, for example ads, that are related or relevant to the retrieved content for display to users 150, 152, and 154. As discussed further below, these relevant ads may be provided from the AMS 106 and may be combined with content for display to users 150, 152, and 154. In some examples, the publishers 104 may retrieve content for display on a particular user access device 108 and then forward the content to the user access device 108 along with code that causes one or more ads from the AMS 106 to be displayed to the user 150, 152, or 154. In other examples, the publishers 104 may retrieve content, retrieve one or more relevant ads (e.g., from the AMS 106 or the advertisers 102), and then integrate the ads and the article to form a content page for display to the user 150, 152, or 154.

As noted above, one or more of the publishers 104 may represent a content network. In such an implementation, the advertisers 102 may be able to present ads to users through this content network.

The publishers 104 may include or maintain one or more data processing systems 114, such as servers or embedded systems, coupled to the network 110. They may include or maintain one or more processes that run on data processing systems. In some examples, the publishers 104 may include one or more content repositories 124 for storing content and other information.

The AMS 106 manages ads and provides various services to the advertisers 102, the publishers 104, and the user access devices 108. The AMS 106 may store ads in an ad repository 126 and facilitate the distribution or selective provision and recommendation of ads through the environment 100 to the user access devices 108. In some configurations, the AMS 106 may include or access functionality associated with the AdWords™, AdSense™, and/or AdMob™ systems provided by Google Inc. (Mountain View, Calif.).

The AMS 106 may include one or more data processing systems 116, such as servers or embedded systems, coupled to the network 110. It can also include one or more processes, such as server processes. In some examples, the AMS 106 may include an ad serving system 120 and one or more backend processing systems 118. The ad serving system 120 may include one or more data processing systems 116 and may perform functionality associated with delivering ads to publishers or user access devices 108. The backend processing systems 118 may include one or more data processing systems 116 and may perform functionality associated with identifying relevant ads to deliver, processing various rules, performing filtering processes, generating reports, maintaining accounts and usage information, and other backend system processing. The AMS 106 can use the backend processing systems 118 and the ad serving system 120 to selectively recommend and provide relevant ads from the advertisers 102 through the publishers 104 to the user access devices 108.

The AMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publisher content, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The AMS 106 may include one or more interface or frontend modules for providing the various features to advertisers, publishers, and user access devices. For example, the AMS 106 may provide one or more publisher front-end interfaces (PFEs) for allowing publishers to interact with the AMS 106. The AMS 106 may also provide one or more advertiser front-end interfaces (AFEs) for allowing advertisers to interact with the AMS 106. In some examples, the front-end interfaces may be configured as web applications that provide users with network access to features available in the AMS 106.

The AMS 106 provides various advertising management features to the advertisers 102. In some examples, the AMS 106 may include features for advertisers similar to those in the AdWords™ system provided by Google Inc. The AMS 106 advertising features may allow users to set up user accounts, set account preferences, create ads, select keywords for ads, create campaigns or initiatives for multiple products or businesses, view reports associated with accounts, analyze costs and return on investment, selectively identify customers in different regions, selectively recommend and provide ads to particular publishers, analyze financial information, analyze ad performance, estimate ad traffic, access keyword tools, add graphics and animations to ads, etc.

The AMS 106 may allow the advertisers 102 to create ads and input keywords for which those ads will appear. In some examples, the AMS 106 may provide ads to user access devices or publishers when keywords associated with those ads are included in a user request or requested content. The AMS 106 may also allow the advertisers 102 to set bids for ads. A bid may represent the maximum amount an advertiser is willing to pay for each ad impression, user click-through of an ad or other interaction with an ad. A click-through can include any action a user takes to select an ad. The advertisers 102 may also choose a currency and monthly budget.

The AMS 106 may also allow the advertisers 102 to view information about ad impressions, which may be maintained by the AMS 106. The AMS 106 may be configured to determine and maintain the number of ad impressions relative to a particular website or keyword. The AMS 106 may also determine and maintain the number of click-throughs for an ad as well as the ratio of click-throughs to impressions.

The AMS 106 may also allow the advertisers 102 to select and/or create conversion types for ads. A "conversion" may occur when a user consummates a transaction related to a given ad. A conversion could be defined to occur when a user clicks on an ad, is referred to the advertiser's web page, and consummates a purchase there before leaving that web page. In another example, a conversion could be defined as the display of an ad to a user and a corresponding purchase on the advertiser's web page within a predetermined time (e.g., seven days). The AMS 106 may store conversion data and other information in a conversion data repository 136.

The AMS 106 may allow the advertisers 102 to input description information associated with ads. This information could be used to assist the publishers 104 in determining ads to publish. The advertisers 102 may additionally input a cost/value associated with selected conversion types, such as a five dollar credit to the publishers 104 for each product or service purchased.

The AMS 106 may provide various features to the publishers 104. In some examples, the AMS 106 may include features for publishers similar to those in the AdSense™ system provided by Google Inc. The AMS 106 may deliver ads (associated with the advertisers 102) to the user access devices 108 when users access content from the publishers 104. The AMS 106 can be configured to deliver ads that are relevant to publisher sites, site content, and publisher audiences.

In some examples, the AMS 106 may crawl content provided by the publishers 104 and deliver ads that are relevant to publisher sites, site content and publisher audiences based on the crawled content. The AMS 106 may also selectively recommend and/or provide ads based on user information and behavior, such as particular search queries performed on a search engine website, or a designation of an ad for subsequent review, as described herein, etc. The AMS 106 may store user-related information in a general database 146. In some examples, the AMS 106 can add search services (e.g., a Google™ search box) to a publisher site and deliver ads configured to provide appropriate and relevant content relative to search results generated by requests from visitors of the publisher site. A combination of these and other approaches can be used to deliver relevant ads.

The AMS 106 may allow the publishers 104 to search and select specific products and services as well as associated ads to be displayed with content provided by the publishers 104. For example, the publishers 104 may search through ads in the ad repository 126 and select certain ads for display with their content.

The AMS 106 may be configured to selectively recommend and provide ads created by the advertisers 102 to the user access devices 108 directly or through the publishers 104. The AMS 106 may selectively recommend and provide ads to a particular publisher 104 (as described in further detail herein) or a requesting user access device 108 when a user requests search results or loads content from the publisher 104.

In some implementations, the AMS 106 may manage and process financial transactions among and between elements in the environment 100. For example, the AMS 106 may credit accounts associated with the publishers 104 and debit accounts of the advertisers 102. These and other transactions may be based on conversion data, impressions information and/or click-through rates received and maintained by the AMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed advertisers 102, publishers 104 and/or user access devices 108, which may be discrete, integrated modules or distributed systems. Similarly, the environment 100 is not limited to a single AMS 106 and may include any number of integrated or distributed AMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
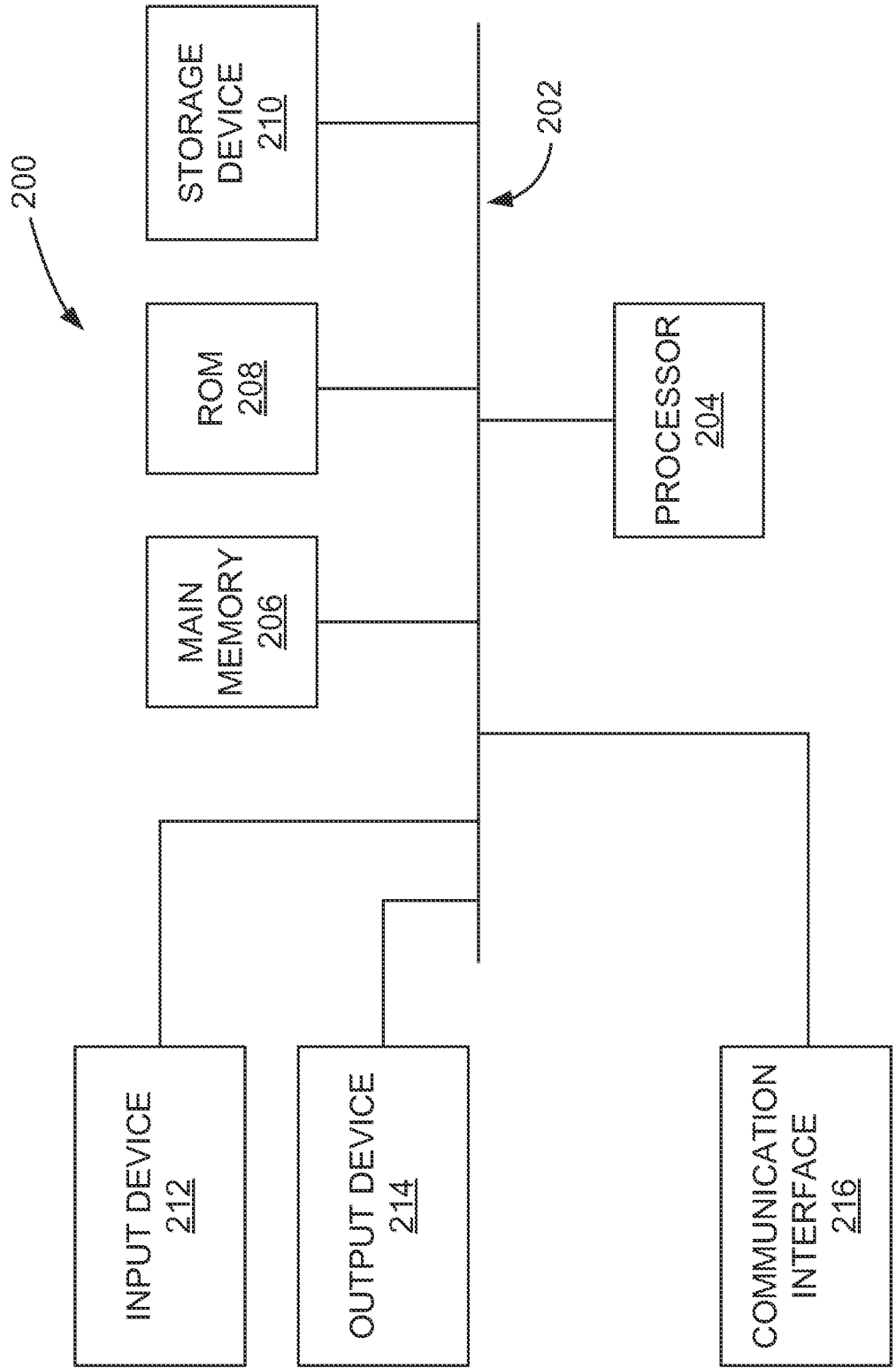
FIG. 2 is a block diagram of a computing device used for enhancing and providing an offer included within an online advertisement as shown in the advertising environment of FIG. 1.

FIG. 2 is a block diagram of a computing device 200 used for enhancing and providing an offer included within an online advertisement as shown in advertising environment 100 shown in FIG. 1. In the example embodiment, computing device 200 could be user access device 108 or any of data processing devices 112, 114, or 116 (shown in FIG. 1). Computing device 200 may include a bus 202, a processor 204, a main memory 206, a read only memory (ROM) 208, a storage device 210, an input device 212, an output device 214, and a communication interface 216. Bus 202 may include a path that permits communication among the components of computing device 200.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive.

Input device 212 may include a conventional mechanism that permits computing device 200 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 200 to communicate with other devices and/or systems. For example, communication interface 216 may include mechanisms for communicating with another device or system via a network, such as network 110 (shown in FIG. 1).

As described herein, computing device 200 facilitates the presentation of content from one or more publishers, along with one or more sets of sponsored content, for example ads, to a user. Computing device 200 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
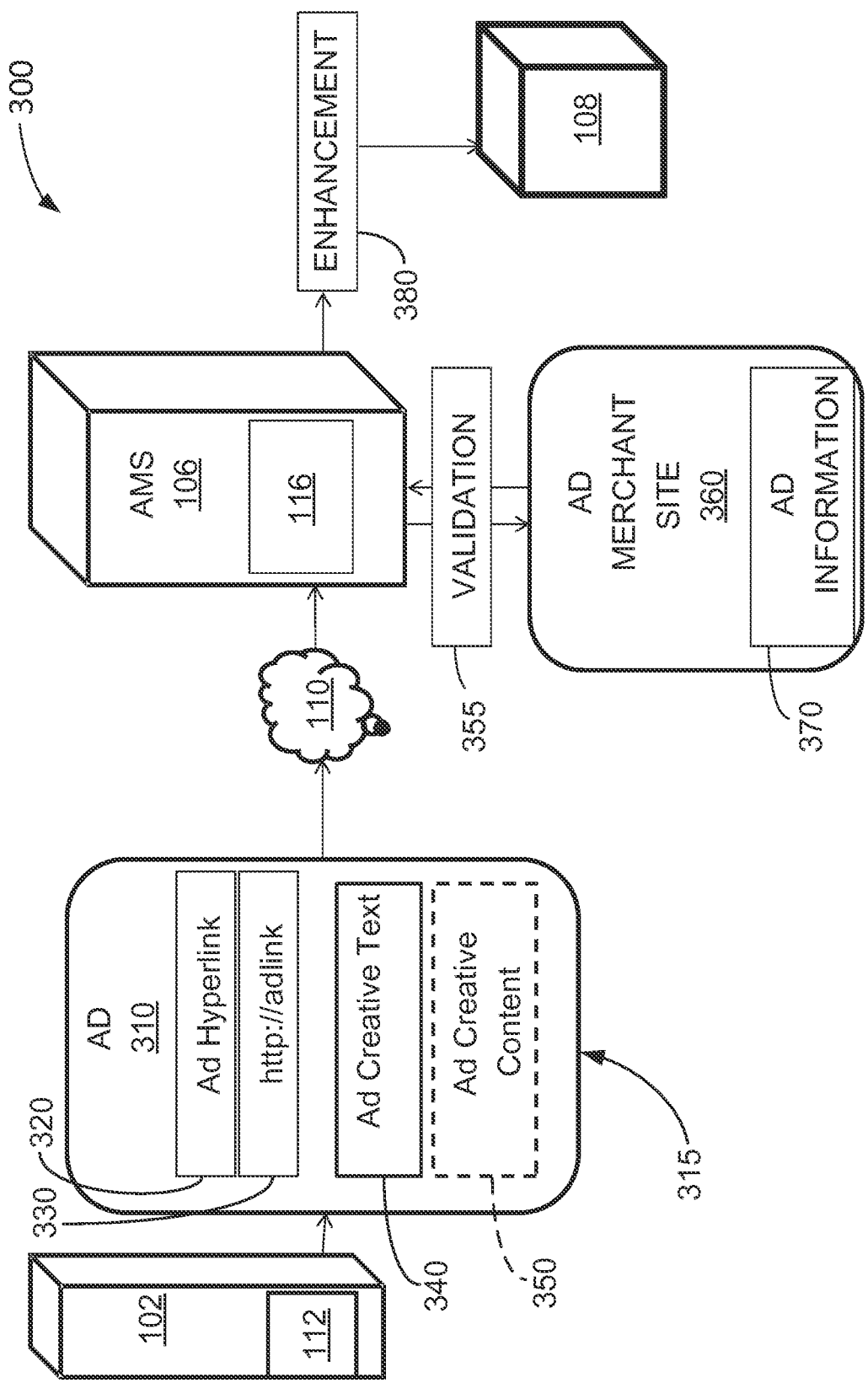
FIG. 3 is an example process flow of an online ad provided being evaluated for the presence of an online offer and served to a user access device using the advertising environment shown in FIG. 1.

FIG. 3 is an example process flow 300 of an online ad provided being evaluated for the presence of an online offer, and served to user access device 108 (shown in FIG. 1) using the advertising environment shown in FIG. 1. In the example embodiment the online ad is provided by advertiser 102 (shown in FIG. 1) to AMS 106 (shown in FIG. 1) for evaluation and serving.

Process flow 300 includes advertiser 102 capable of storing ad 310 and transmitting ad 310 over network 110. Advertiser 102 stores ad 310 and transmits ad 310 using data processing system 112 (shown in FIG. 1). Ad 310 includes display information 315 representing information associated with the display of ad 310 when served to user access device 108. Display information 315 is displayed on an ad display and includes any text, graphics, animation, formatting, style, data, or metadata associated with the presentation of ad 310. Display information 315 includes ad hyperlink 320, ad website address 330, and ad creative text 340. Ad hyperlink 320 is a web hyperlink that a user, for example user 152 (shown in FIG. 1), can click on to navigate to a particular page on a merchant site associated with ad 310 and advertiser 102. Ad website address 330 is a text based uniform resource locator ("URL") which can reflects a location on the merchant site associated with ad 310 and advertiser 102. Ad website address 330 may correspond to the URL address associated with ad hyperlink 320 or may point to a separate Internet location. Ad creative text 340 is a text-based message associated with ad 310 and served in conjunction with ad 310. Ad creative text 340 may include statements about the quality of the merchant site, generally, or specific statements about goods and services provided by the merchant site. Specific statements about goods and services provided by the merchant site may include a creative offer with text indicating an offer that may appeal to a user.

In some examples, ad 310 may also include additional ad creative content 350. Ad creative content 350 may be supplemental text to ad creative text 340, graphics associated with ad 310, animation associated with ad 310, or any other creative content that may be provided by advertiser 102 and served by AMS 106 to user access device 108. Advertiser 102 is capable of communicating with AMS 106 through data processing system 112 by use of network 110.

AMS 106 may contain a plurality of data processing systems 116. At least one data processing system 116 is configured to receive ad 310 over network 110. Data processing system 116 is configured to be able to store ad 310 in a memory device. In this example, data processing system 116 can store ad 310 in main memory 206 (shown in FIG. 2). In other examples, data processing system 116 can store ad 310 in at least one of ROM 208 (shown in FIG. 2), storage device 210 (shown in FIG. 2), and main memory 206. Data processing system 116 also contains processor 204 (shown in FIG. 2) which is capable of running instructions stored in at least one of main memory 206, ROM 208, and storage device 210.

AMS 106 is also capable of interacting with validation process 355 and serving data to user access device 108. Validation process 355 represents a method of validating that ads 310 presented by advertisers 102 to AMS 106 and identified as containing candidate offers within their respective online candidate advertisements contain valid offers. Validation process 355 includes comparing ad 310 to ad merchant site 360.

Ad merchant site 360 is an online merchant site associated with ad 310 and corresponding to the URL that user 152 may navigate to by clicking ad hyperlink 320. Ad merchant site 360 may present goods, services, information, or other resources that may be appealing to user 152. Ad merchant site 360 may include an online store or an online service where user 152 can purchase goods or services. Ad merchant site 360 also includes ad information 370. Ad information 370 represents any information that is available on ad merchant site 360. Ad information 370 may be, without limitation, text-based, graphical, video, interactive, or combinations thereof.

Enhancement process 380 describes a process that AMS 106 (or, more specifically, data processing system 116) will undertake to enhance ads 310 which require an enhancement of display information 315 based upon the outcome of validation process 355. Enhancement process 380 will occur prior to providing ad 310 to user access device 108.

User access device 108 is capable of using applications thereon that may receive data from network 110 including ads 310 served by AMS 106. User access device 108 may present received ads 310 on a variety of applications and in a variety of contexts.

In operation, advertiser 102 transmits ad 310 to AMS 106 over network 110. Advertiser 102 transmits ad 310 using data processing system 112. AMS 106 receives ad 310 at data processing system 116 which stores ad 310 into main memory 206. In other examples, ad 310 may be stored in at least one of main memory 206, ROM 208, and storage device 210. Data processing system 116 runs identification processes stored on at least one of main memory 206, ROM 208, or storage device 210 on stored ad 310. Identification processes are executed on processor 204.

A first identification process uses at least one of regular expression patterns and natural language processing methods to identify an offer (also referred to herein as a candidate offer) included within ad 310. Regular expression patterns refer to methods of matching strings of text including characters or words from a sample set of text. A candidate offer refers to potential offers that may exist in ad 310, display information 315, or components thereof. In this example, regular expression patterns may be applied to ad 310 to identify ads 310 that may contain offers such as candidate offers. Accordingly, regular expression patterns may attempt to match on terms that refer to offers. For example, regular expression patterns may be applied to ads 310 to attempt to identify or match ads 310 that contain ad creative text 340 or ad creative content 350 with strings including "sale", "discount", or "limited." Matching ads 310 will be identified as online candidate advertisements containing candidate offers. In this example, regular expression patterns are primarily applied to ad creative text 340 or ad creative content 350. In other examples, regular expression patterns may be applied to any part of display information 315.

Natural language processing describes methods and algorithms designed to allow computers to determine objective meaning from human created content. In this example, natural language processing may be applied to ad 310 to identify ads 310 that may contain offers. Natural language processing may use heuristic methods to allow data processing system 116 to learn from prior reviews and distinguish ads 310 that contain offers from ads that do not. Ads 310 that are detected as potentially containing offers using natural language processing methods will be identified as online candidate advertisements containing candidate offers.

A second identification process uses at least one of regular expression patterns and natural language processing methods to ignore a candidate offer included within ad 310. In other words, this second identification process uses regular expression patterns and natural language processing to filter out ads 310 that are identified as online candidate advertisements using the first identification process but should be screened out regardless. Ads 310 identified by this second identification process may be ignored because they are associated with poor quality offers or false positive offers. For example, regular expression patterns may be applied to ads 310 to attempt to identify or match ads 310 that contain creative text 340 or ad creative content 350 with strings indicating that a promotion ended before ad 310 is served. Matching ads 310 will be unlisted as online candidate advertisements containing candidate offers. In this example, regular expression patterns are primarily applied to ad creative text 340 or ad creative content 350. In other examples, regular expression patterns may be applied to any part of display information 315.

AMS 106 may receive many ads 310 that must be processed to identify offers. Due to significant volumes of ads 310 to process, data processing system 116 uses a programming model for large data sets to efficiently process ads 310. The programming model used may be any model suitable for processing large sets of data.

Ads 310 identified as online candidate advertisements are validated using validation process 355. Validation process 355 involves comparing the online candidate advertisement (e.g., ad 310 and associated display information 315) to ad merchant site 360 and, more specifically, to ad information 370. In this example, validation process 355 involves a manual reviewer (not shown) receiving a list of candidate ads 310, navigating to ad merchant site 360 based upon ad hyperlink 320 or ad website address 330, and comparing the content of ad 310 (e.g., display information 315 or components thereof) to ad merchant site 360 and ad information 370. The reviewer may determine that ad creative text 340 does or does not reflect what is presented as ad information 370. If ad 310 is inconsistent with ad merchant site 360 and/or ad information 370, ad 310 will be regarded as invalidated. Invalidated ads 310 will be served without enhancement. If ad 310 is consistent with ad merchant site 360 and/or ad information 370, ad 310 will be regarded as valid.

In other examples, validation process 355 involves an automated process where candidate ads 310 are received by data processing system 116 and processor 204 initiates an automated validation process stored on at least one of main memory 206, ROM 208, and storage device 210. The automated validation process involves data processing system 116 first requesting and receiving ad information 370 from ad merchant site 360 using ad hyperlink 320. The automated validation process then compares received ad information 370 to ad 310 and, more specifically, to ad creative text 340 and to ad creative content 350. The automated validation process may make comparisons using regular expression patterns, described above, or any other language or information analysis method suitable for comparing information presented on ad merchant site 360 to data contained in ad 310 and display information 315.

Ads 310 that are identified as online candidate advertisements and validated using validation process 355 are enhanced using enhancement process 380. Enhancement process 380 involves altering display information 315 associated with ad 310 before ad 310 is served to user 152. Altering display information 315 may include, without limitation, adding additional text to display information 315, adding additional graphics to display information 315, or adding additional user-interface features to display information 315. Such enhancements may include, without limitation, changes, additions, or deletions to elements related to presentation of ad 310. Enhancement process 380 is designed to increase the ability of user 152 to identify that ad 310 contains an offer. This is meant to encourage users 152 who are responsive to such an offer to review ad 310 and potentially navigate to ad merchant site 360.

In some examples, ad 310 may include extended advertisement information. This information may include data of a kind that is not present in other ads 310 or ad displays 315. For example, some advertisers may include specific location or contact information with ads 310. Such extended advertisement information may be included as ad creative content 350 or in other forms. In such cases, if such ads 310 are determined to contain validated offers, display information 315 associated with ad 310 may be enhanced by making this extended advertisement information more notable when providing ad 310. Such enhancement may include, without limitation, improving the user-interface to display extended advertisement information prominently and placing the extended advertisement information prominently in display information 315.

Enhancement process 380 also includes a method of removing enhancements in display information 315 from ad 310. Removing enhancements represents enhancement process 380 returning an display information 315 that is otherwise eligible for an enhanced display (i.e., it is identified as a validated online candidate advertisement) to an ordinary display information 315. Removing enhancements may be desirable if there are a variety of ads 310 containing offers and rotation is desirable. Removing enhancements may also be desirable if ads 310 have had enhancement for an extended period of time. Removing enhancements can be performed by altering display information 315 associated with ad 310 before providing. Removing enhancements may be conducted on a schedule. This schedule may be, without limitation, a fixed schedule (i.e., a predefined enhancement removal will occur for all ads 310 after a fixed period), a configurable schedule (i.e., each ad 310 may have a unique schedule for enhancement removal), and a schedule that varies based upon advertising types (i.e., particular categories of ads 310 have divergent schedules from one another.)

Once enhancement process 380 has been performed, AMS 106 can present ad 310 to user access device 108 and user 152. Because of the use of the processes described, some ads 310 will be received with enhanced display information and some will not.

Figure 4:
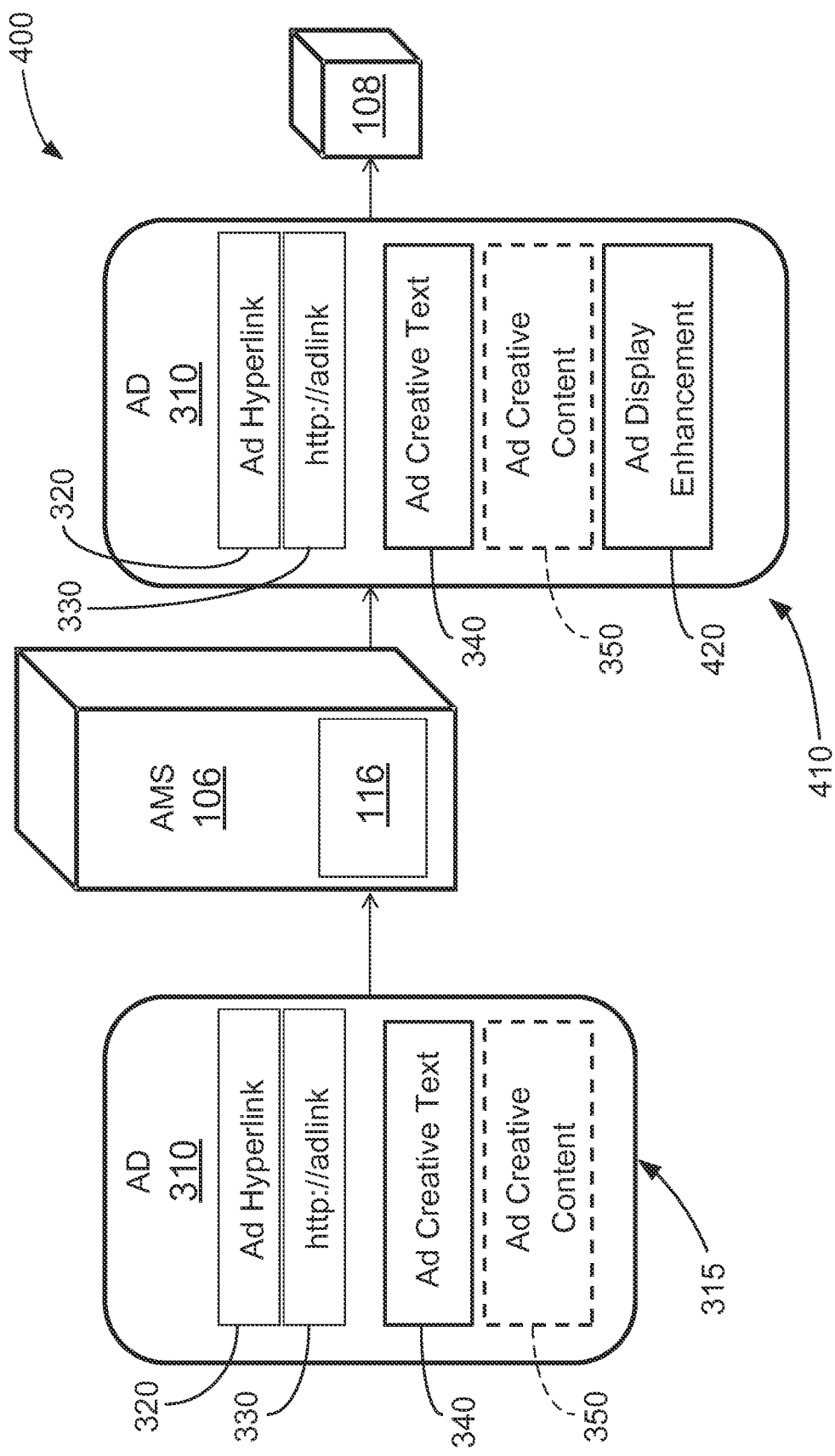
FIG. 4 is an example process flow of an online ad being served with an enhanced display information using the advertising environment shown in FIG. 1.

FIG. 4 is an example process flow 400 of an online ad 310 being served with an enhanced ad display 410 using the advertising environment shown in FIG. 1. Ad display 410 is an example of display information. In the example embodiment, online ad 310 is provided by advertisers 102 to AMS 106. More specifically, process 400 shows ad 310 enhanced using enhancement process 380 (shown in FIG. 3) after being identified as online candidate advertisements containing candidate offers and having such candidate offers validated using validation process 355 (shown in FIG. 3).

Ad 310 is transmitted by advertisers 102 (shown in FIG. 1) to AMS 106. As described in FIG. 3, ad 310 is associated with display information 315. Display information 315 includes ad hyperlink 320, ad website address 330, and ad creative text 340. In some examples, ad 310 includes ad creative content 350. AMS 106 includes data processing system 116 which is configured to execute processes at processor 204 (shown in FIG. 2). AMS 106 is also capable of serving ads 310 to user access device 108.

In operation, ad 310 is received by AMS 106 at data processing system 116. Data processing system 116 runs processes (described in FIG. 3) to identify ads 310 that may contain candidate offers using processor 204. Ads 310 that may contain candidate offers (i.e., online candidate advertisements) are submitted to validation process 355 (shown in FIG. 3). Ads 310 that are validated by validation process 355 enter enhancement process 380 where they receive enhanced ad display 410 including display information enhancement 420. Display information enhancement 420 may include, adding additional text to display information 315, adding additional graphics to display information 315, or adding additional user-interface features to display information 315. Display information enhancement 420 may also include highlighting extended advertisement information. AMS 106 then presents these ads with enhanced ad display 410 to user access device 108.

Figure 5:
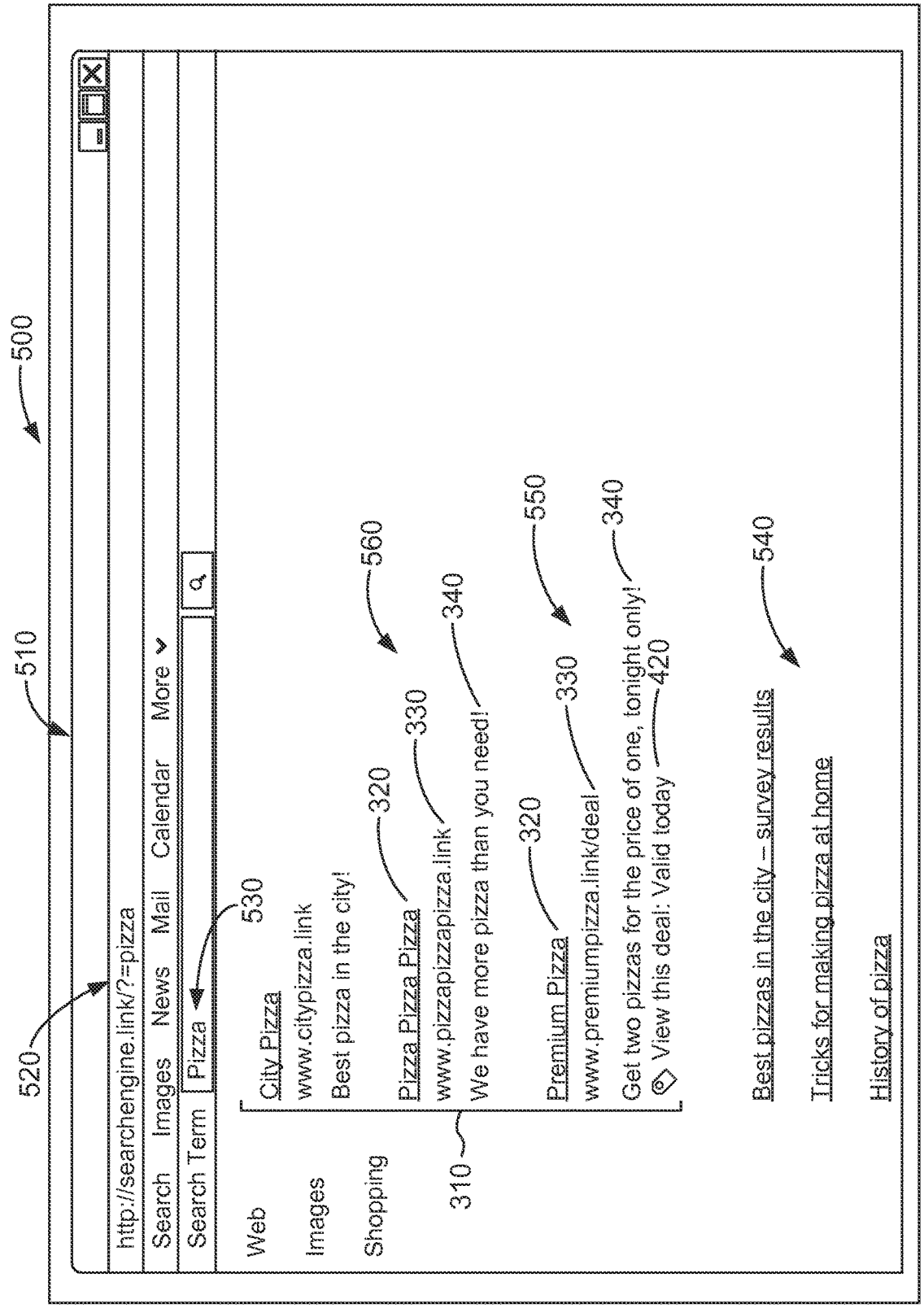
FIG. 5 is an example user access device displaying online ads with the enhanced display information of FIG. 4 and online ads without the enhanced display information.

FIG. 5 is an example user interface 500 displayed on user access device 108 (shown in FIG. 1). User interface 500 displays online ads with enhanced display information 550 and online ads without enhanced display information 560. That is, computing device 108, which in this example is a laptop computer, is displaying a software application ("application") 510, which in this example is an Internet browser ("browser"). In other examples, software application 510 may be any application capable of working within advertising environment 100 (shown in FIG. 1) to receive content from network 110 (shown in FIG. 1). Software application 510 may include, without limitation, other internet browsers, email browsers, web-based applications, or any other application capable of working in advertising environment 100 and displaying information received from network 110 including ads 310.

Software application 510 contains search results 520 responsive to search query 530. Search results 520 include search content 540 and ads 310. Search content 540 reflects information and websites served in response to search query 530. Ads 310 represent a plurality of online advertisements created by advertisers 102 (shown in FIG. 1) and served over network 110 by AMS 106 (shown in FIG. 1). As described in FIG. 1, AMS 106 serves ads 310 which are similarly responsive to search query 530. Ads 310 include online ads with enhanced display information 550 and online ads without enhanced display information 560.

Online ads with enhanced display information 550 and online ads without enhanced display information 560 both contain an ad hyperlink 320, an ad website address 330, and ad creative text 340. However, only online ads with enhanced display information 550 contain display information enhancement 420.

In operation, software application 510 is used by user 152 (shown in FIG. 1) on user access device 108. User access device 108 transmits search query 530 over network 110 to a search engine (not shown) which identifies responsive content created by publishers 104 (shown in FIG. 1) and responsive ads 310 created by advertisers 102 and served on AMS 106. Responsive content and responsive ads are content and ads 310 that are determined by the search engine to be relevant to search query 530. Software application 510 receives, over network 110, a response from the search engine to present search results 520.

In this example, software application 510 is an internet browser. In other examples, software application 510 displays responsive content created by publishers 104 and ads created by advertisers 102 without using a search engine. In these other examples, software application 510 may display responsive content through the use of, without limitation, web-based email, social networks, online applications, or desktop applications with internet connectivity. In these other examples, search query 530 may not be used. Instead, responsive ads and responsive content may not be determined based upon search query 530, but instead on other information presently displayed on software application 510.

In all examples, ads 310 presented on software application 510 are served by AMS 106 over network 110. AMS 106 enhances, in processes shown and described in FIG. 3 and FIG. 4, ads 310 which are identified and validated as containing offers, particularly in ad creative text 340 and ad creative content 350. In this example, online ad with enhanced display information 550 has been identified as containing a candidate offer, validated with validation process 355, and enhanced with enhancement process 380. Online ad without enhanced display information 560 may have not been identified as containing a candidate offer, not been validated by validation process 355, or had display information enhancement 420 removed because of a schedule.

Figure 6:
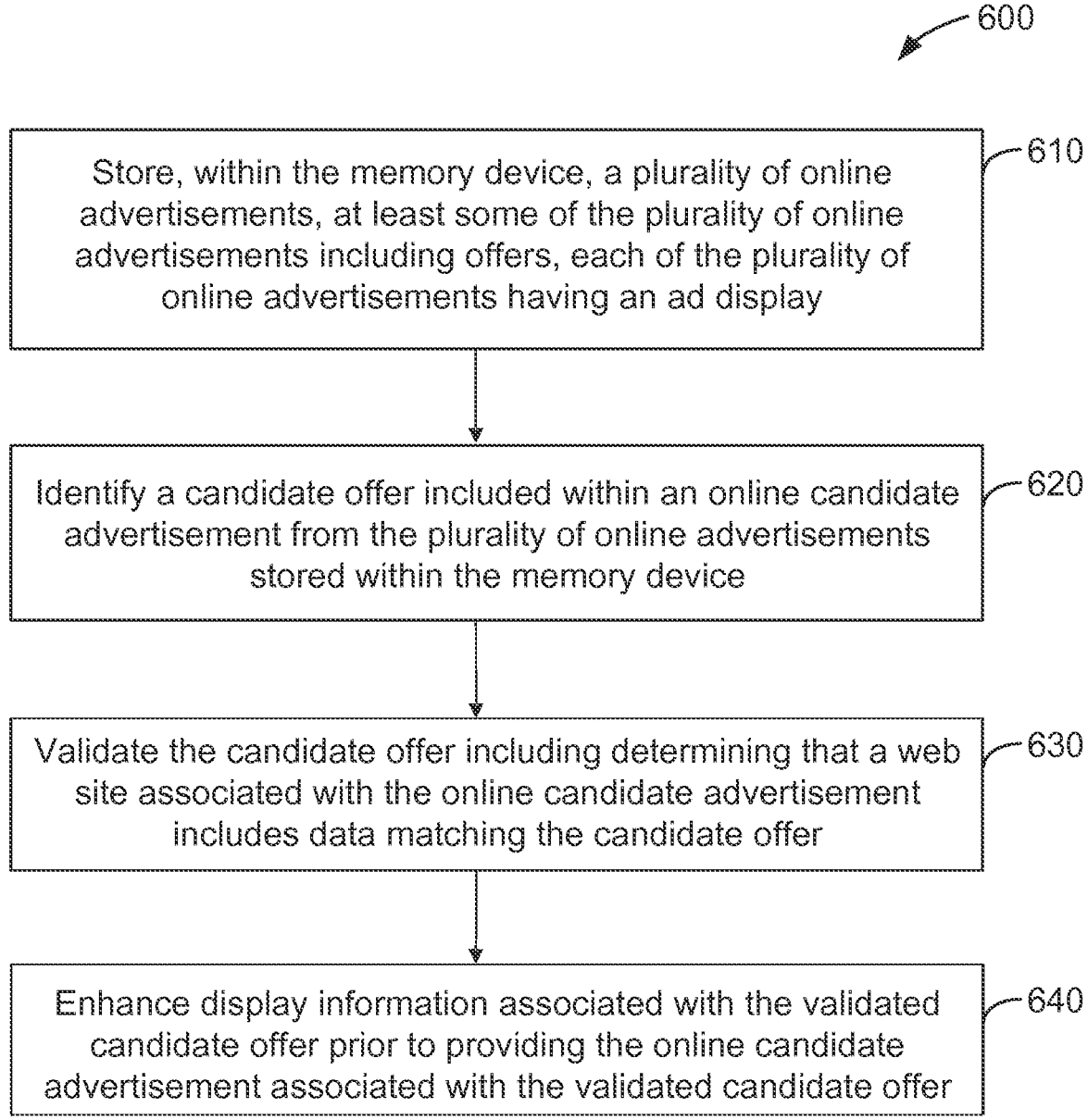
FIG. 6 is an example method of enhancing an offer included within an online advertisement using the advertising environment shown in FIG. 1.

FIG. 6 is an example method 600 of enhancing an offer included within an online advertisement. Method 600 includes storing 610, within the memory device, a plurality of online advertisements, at least some of the plurality of online advertisements including offers. Storing 610 represents AMS 106 (shown in FIG. 1), at data processing system 116 (shown in FIG. 1), storing ads 310 (shown in FIG. 3) in at least one of main memory 206 (shown in FIG. 2), ROM 208 (shown in FIG. 2), and storage device 210 (shown in FIG. 2). Storing 610 further represents AMS 106 storing ads 310 which include display information 315 (shown in FIG. 3) where display information 315 includes ad hyperlink 320, ad website address 330, and ad creative text 340.

Method 600 also includes identifying 620 a candidate offer included within an online candidate advertisement from the plurality of online advertisements stored within the memory device. Identifying 620 represents data processing system 116 applying processes at processor 204, described in FIG. 3, to identify ads 310 which may contain offers.

Method 600 further includes validating 630 the candidate offer including determining that a web site associated with the online candidate advertisement includes data matching the candidate offer. Validating 630 represents using validation process 355 (shown in FIG. 3) to determine whether data contained in display information 315 (shown in FIG. 3) corresponds to ad information 370 (shown in FIG. 3).

Method 600 additionally includes enhancing 640 the ad display associated with the validated candidate offer when serving the online candidate advertisement associated with the validated candidate offer. Enhancing 640 represents using enhancement process 380 (shown in FIG. 3) to enhance ads which are identified as containing candidate offers and validated. Enhancing 640 further represents changing display information 315 associated with ad 310 to enhanced ad display 410 including display information enhancement 420.

Figure 7:
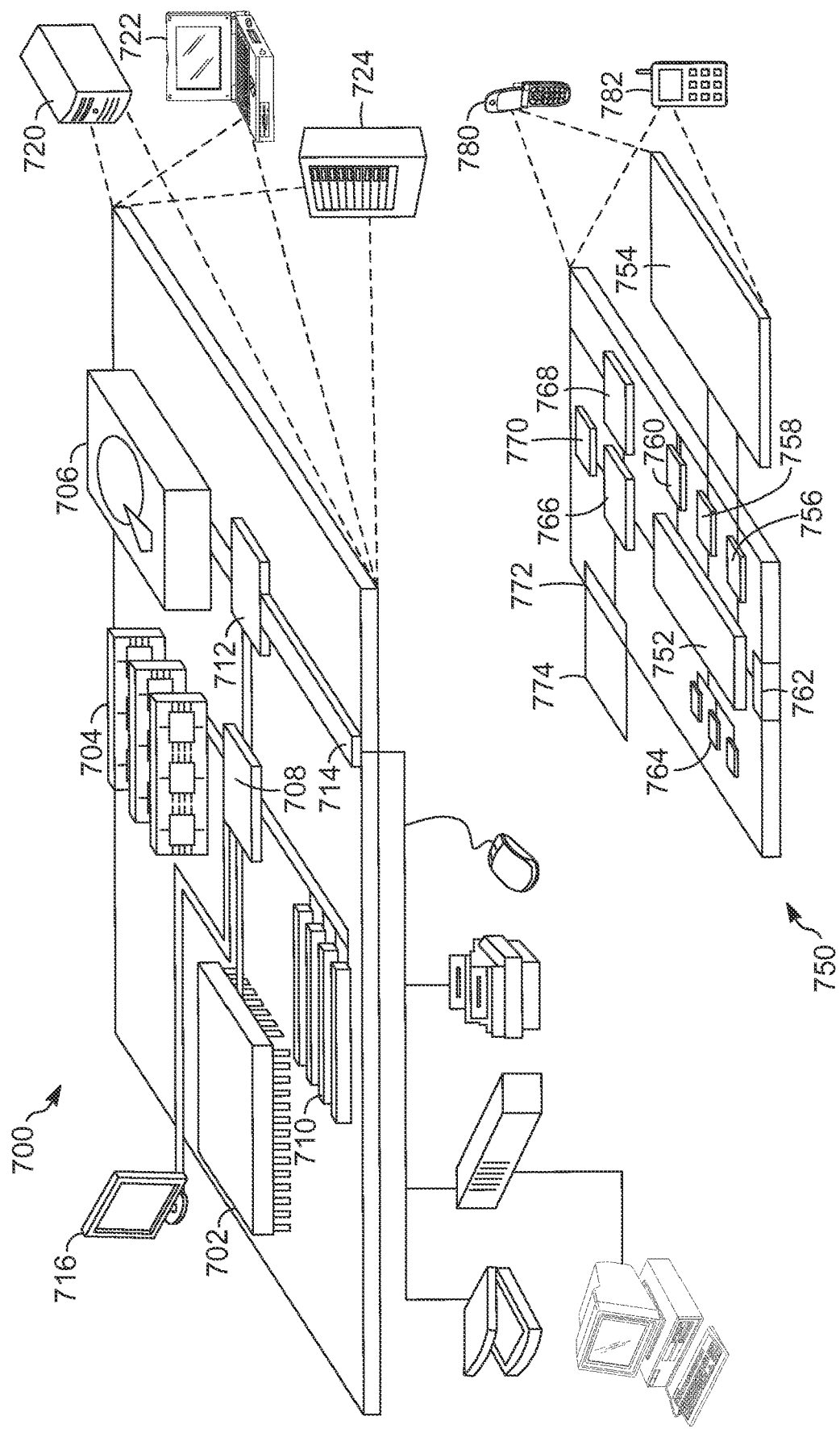
FIG. 7 is a diagram of example computing devices that may be used in the advertising environment shown in FIG. 1.

FIG. 7 is a diagram of example computing devices 700 and 750 that may be used in the environment shown in FIG. 1. More specifically, FIG. 7 shows an example of a generic computing device 700 and a generic mobile computing device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be examples only, and are not meant to limit implementations of the subject matter described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is for purposes of example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning system) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 700 and 750 are configured to receive and display content and sponsored content (e.g. advertisements) from various other computing devices connected to computing devices 700 and 750 through a communication network, allow a user to designate sponsored content for subsequent review, and display the sponsored content to the user at subsequent times. Computing systems 700 and 750 are further configured to manage and organize data associated with carrying out the above-described functions within at least one of memory 704, storage device 706, and memory 764 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for verifying that content items include textual content corresponding to content included in website information for webpages accessible via the respective content items, implemented by one or more servers coupled to a memory device, the method comprising:

parsing, by the one or more servers, textual content of each of a plurality of content items using language processing to match the textual content to predetermined character strings, each respective content item linked to a respective webpage accessible via an action performed on the respective content item;

identifying, using the one or more servers, responsive to parsing the textual content, that textual content of a first content item of the plurality of content items includes a first character string that matches at least one of the predetermined character strings;

accessing, by the one or more servers, responsive to identifying that the first character string of the first content item matches at least one of the predetermined character strings, the respective webpage accessible via the first content item;

retrieving, by the one or more servers, a set of website information from the particular webpage accessible via the action performed on the first content item, the set of information including content on web site;

determining, by the one or more servers, that the first character string included in the textual content of the first content item matches the content included in the set of web site information retrieved from the webpage accessible via the action performed on the first content item, the content included in the set of website information including the first character string;

generating, by the one or more servers, in response to determining that the predetermined character string included in the textual content of the first content item matches the content included in the set of website information, a second content item that includes content of the first content item; and providing, by the one or more servers, instructions to display, responsive to a request from a client device, the second content item with a visual indicator identifying that the one or more servers previously matched the first character string included in the textual content of the first content item with the content included in the set of website information retrieved from the webpage accessible via the action performed on the first content item.

2. The method of claim 1, further comprising:
using at least one language processing method to ignore candidate content items included within the plurality of content items wherein the at least one language processing method includes at least one of:
a natural language processing method; and
a method of applying regular expression patterns.

3. The method of claim 1, wherein the generating further comprises at least one of:
adding additional text to the display information;
adding additional graphics to the display information; and
adding additional user-interface features to the display information.

4. The method of claim 1, further comprising serving the second content item with extended content item information wherein the extended content item information includes information associated with a content provider, the content provider being associated with the enhanced display information.

5. The method of claim 1 further comprising:
removing content corresponding to the visual indicator prior to providing the second content item based upon at least one of:
a fixed schedule;
a configurable schedule; and
a schedule that varies based upon content item types.

6. The method of claim 1 further comprising:
using a large dataset programming model to identify the first content item.

7. A computing device for verifying that content items include textual content corresponding to content included in website information for webpages accessible via the respective content items, the computing device comprising a memory device for storing data, and a processor in communication with the memory device, said processor programmed to:

parse textual content of each of a plurality of content items using language processing to match the textual content to predetermined character strings, each respective content item linked to a respective webpage accessible via an action performed on the respective content item;

identify, responsive to parsing the textual content, that textual content of a first content item of the plurality of content items includes a first character string that matches at least one of the predetermined character strings;

access, responsive to identifying that the first character string of the first content item matches at least one of the predetermined character strings, the respective webpage accessible via the first content item;

retrieve a set of website information from the webpage accessible via the action performed on the first content item, the set of information including content on web site;

determine that the first character string included in the textual content of the first content item matches the content included in the set of web site information retrieved from the webpage accessible via the action performed on the first content item, the content included in the set of website information including the first character string;

generate, in response to determining that the predetermined character string included in the textual content of the first content item matches the content included in the set of website information, a second content item that includes content of the first content item; and provide, for display, instructions to display, responsive to a request from a client device, the second content item with a visual indicator identifying that the one or more servers previously the first character string included in the textual content of the first content item with the content included in the set of website information retrieved from the webpage accessible via the action performed on the first content item.

8. The computing device of claim 7, wherein said processor is further programmed to:
use at least one language processing method to ignore candidate content items included within the plurality of content items wherein the at least one language processing method includes at least one of:
a natural language processing method; and
a method of applying regular expression patterns.

9. The computing device of claim 7, wherein said processor is further programmed to:
add additional text to the display information;
add additional graphics to the display information; and
add additional user-interface features to the display information.

10. The computing device of claim 7, wherein said processor is further programmed to:
serve the second content item with extended content item information wherein the extended content item information includes information associated with a content provider, the content provider being associated with the enhanced display information.

11. The computing device of claim 7, wherein said processor is further programmed to:
remove content corresponding to the visual indicator prior to providing the second content item based upon at least one of:
a fixed schedule;
a configurable schedule; and
a schedule that varies based upon content item types.

12. The computing device of claim 7, wherein said processor is further programmed to:
use a large dataset programming model to identify the first content item.

13. A computer-readable storage device, having processor-executable instructions embodied thereon for verifying that content items include textual content corresponding to content included in website information for webpages accessible via the respective content items, wherein the computing device includes at least one processor and a memory device coupled to the processor, wherein, when executed by the computing device, the processor-executable instructions cause the computing device to:
parse textual content of each of a plurality of content items using language processing to match the textual content to predetermined character strings, each respective content item linked to a respective webpage accessible via an action performed on the respective content item;
identify, responsive to parsing the textual content, that textual content of a first content item of the plurality of content items includes a first character string that matches at least one of the predetermined character strings;
access, responsive to identifying that the first character string of the first content item matches at least one of the predetermined character strings, the respective webpage accessible via the first content item;
retrieve a set of web site information from the particular webpage accessible via the action performed on the first content item the set of information including content on website;
determine that the first character string included in the textual content of the first content item matches the content included in the set of web site information retrieved from the webpage accessible via the action performed on the first content item, the content included in the set of website information including the first character string;
generate, in response to determining that the predetermined character string included in the textual content of the first content item matches the content included in the set of website information, a second content item that includes content of the first content item; and
provide, for display, instructions to display, responsive to a request from a client device, the second content item with a visual indicator identifying that the one or more servers previously matched the first character string included in the textual content of the first content item with the content included in the set of website information retrieved from the webpage accessible via the action performed on the first content item.

14. The computer-readable storage device of claim 13, further comprising processor-executable instructions that, when executed by the computing device, cause the computing device to:
use at least one language processing method to ignore candidate content items included within the plurality of content items wherein the at least one language processing method includes at least one of:
a natural language processing method; and
a method of applying regular expression patterns.

15. The computer-readable storage device of claim 13, further comprising processor executable instructions that, when executed by the computing device, cause the computing device to:
add additional text to the display information;
add additional graphics to the display information; and
add additional user-interface features to the display information.

16. The computer-readable storage device of claim 13, further comprising processor-executable instructions that, when executed by the computing device, cause the computing device to:
serve the second content item with extended content item information wherein the extended content item information includes information associated with a content provider, the content provider being associated with the enhanced display information.

17. The computer-readable storage device of claim 13, further comprising processor-executable instructions that, when executed by the computing device, cause the computing device to:
remove the visual indicator prior to providing the second content item based upon at least one of:
a fixed schedule;
a configurable schedule; and
a schedule that varies based upon advertising types.

18. The computer-readable storage device of claim 13, further comprising processor-executable instructions that, when executed by the computing device, cause the computing device to:
use a large dataset programming model to identify the offer.

19. The method of claim 1, further comprising:
querying, by the one or more servers, each of the plurality of content items with a plurality of content strings using regular expression patterns.

* * * * *